US006992131B2

(12) United States Patent
Faissat et al.

(10) Patent No.: US 6,992,131 B2
(45) Date of Patent: Jan. 31, 2006

(54) ADHESIVES

(75) Inventors: Michel L. Faissat, Waterloo (BE); Anthony George Karandinos, St. Stevens-Woluwe (BE); Charles Lewis Sims, Houston, TX (US)

(73) Assignee: ExxonMobil Chemical Patents Inc., Houston, TX (US)

( * ) Notice: Subject to any disclaimer, the term of this patent is extended or adjusted under 35 U.S.C. 154(b) by 168 days.

(21) Appl. No.: 10/370,695

(22) Filed: Feb. 21, 2003

(65) Prior Publication Data

US 2003/0181554 A1 Sep. 25, 2003

Related U.S. Application Data

(60) Provisional application No. 60/368,916, filed on Mar. 29, 2002, provisional application No. 60/366,738, filed on Mar. 22, 2002, provisional application No. 60/366,740, filed on Mar. 22, 2002, and provisional application No. 60/366,777, filed on Mar. 22, 2002.

(51) Int. Cl.
*C08L 23/00* (2006.01)

(52) U.S. Cl. ........................................ 524/528; 524/474

(58) Field of Classification Search ................. 524/474, 524/528

See application file for complete search history.

(56) References Cited

U.S. PATENT DOCUMENTS

| | | | | |
|---|---|---|---|---|
| 4,543,399 A | | 9/1985 | Jenkins, III et al. | 526/70 |
| 4,588,790 A | | 5/1986 | Jenkins, III et al. | 526/67 |
| 4,642,269 A | | 2/1987 | Kohyama et al. | 428/516 |
| 4,761,450 A | * | 8/1988 | Lakshmanan et al. | 524/488 |
| 4,808,561 A | | 2/1989 | Welborn, Jr. | 502/104 |
| 4,897,455 A | | 1/1990 | Welborn, Jr. | 526/129 |
| 4,937,217 A | | 6/1990 | Chang | 502/111 |
| 4,937,301 A | | 6/1990 | Chang | 526/128 |
| 4,950,720 A | | 8/1990 | Randall, Jr. et al. | 525/322 |
| 4,956,207 A | | 9/1990 | Kauffman et al. | 428/34.2 |
| 5,008,228 A | | 4/1991 | Chang | 502/111 |
| 5,017,714 A | | 5/1991 | Welborn, Jr. | 556/12 |
| 5,028,670 A | | 7/1991 | Chinh et al. | 526/73 |
| 5,086,025 A | | 2/1992 | Chang | 502/117 |
| 5,132,281 A | | 7/1992 | Chevallier et al. | 505/1 |
| 5,147,949 A | | 9/1992 | Chang | 526/129 |
| 5,155,080 A | | 10/1992 | Elder et al. | 502/152 |
| 5,278,264 A | | 1/1994 | Spaleck et al. | 526/127 |
| 5,296,434 A | | 3/1994 | Karl et al. | 502/117 |
| 5,318,935 A | | 6/1994 | Canich et al. | 502/117 |
| 5,455,111 A | | 10/1995 | Velasquez Urey | 428/315.5 |
| 5,468,807 A | | 11/1995 | Tsurutani et al. | 525/240 |
| 5,512,625 A | | 4/1996 | Butterbach et al. | 524/490 |
| 5,804,519 A | | 9/1998 | Riswick et al. | 442/392 |
| 5,854,354 A | | 12/1998 | Ueda et al. | 525/322 |
| 5,994,474 A | | 11/1999 | Wey et al. | 525/288 |
| 6,084,048 A | | 7/2000 | Hozumi et al. | 526/348.6 |
| 6,114,261 A | | 9/2000 | Strelow et al. | 442/153 |
| 6,121,401 A | | 9/2000 | Yamamoto et al. | 526/348.6 |
| 6,144,261 A | | 11/2000 | Goto et al. | 331/17 |
| 6,156,856 A | | 12/2000 | Saito et al. | 526/90 |
| 6,160,071 A | | 12/2000 | Galimberti et al. | 526/348.6 |
| 6,180,229 B1 | | 1/2001 | Becker et al. | 428/355 |
| 6,218,457 B1 | | 4/2001 | Fralich et al. | 524/489 |

FOREIGN PATENT DOCUMENTS

| | | |
|---|---|---|
| DE | 19944225 | 3/2000 |
| EP | 0 442 045 | 8/1991 |
| EP | 685495 | 4/1998 |
| EP | 622380 | 9/1998 |
| EP | 577 581 B1 | 7/2000 |
| EP | 769505 | 10/2000 |
| WO | WO 93/19103 | 9/1993 |
| WO | WO 00/46278 | 10/2000 |
| WO | WO 01/46277 | 6/2001 |

OTHER PUBLICATIONS

Abstract for EP 0 442 465, published Aug. 21, 1991 (see line AL).

* cited by examiner

*Primary Examiner*—Peter D. Mulcahy
(74) *Attorney, Agent, or Firm*—Leandro Arechederra; Jeremy P. Welch

(57) ABSTRACT

This invention relates to an adhesive including (a) a copolymer including butene, at least 40 mol % propylene, and from 0 to 30 mol % of a termonomer selected from ethylene and $C_5$ to $C_{20}$ linear, branched or cyclic alpha olefins, wherein the copolymer has (i) a weight average molecular weight of 100,000 or less; (ii) a number average molecular weight of 20,000 or less; (iii) an Mw/Mn of 5 or more; and (iv) a viscosity of 8000 mPa.sec or less at 190° C.; and (b) a hydrocarbon resin, and/or (c) a polypropylene having at least 30% crystallinity having a viscosity of 1500 mPa.s or less at 190° C., or a tactic polypropylene having a viscosity of 1500 mPa.s or less at 190° C., provided that if the tactic polypropylene is not present, then the hydrocarbon resin is a cyclopentadiene-based hydrocarbon resin. This invention also relates to blends of the copolymer described above and isotactic polypropylene without hydrocarbon resin.

47 Claims, No Drawings

ADHESIVES

This application claims the benefit of U.S. Provisional Application Ser. Nos. 60/366,777; 60/366,740; and 60/366,738, all filed Mar. 22, 2002; and 60/368,916, filed Mar. 29, 2002, the disclosures of which are incorporated herein by reference in their entireties.

1. FIELD OF THE INVENTION

This invention relates to adhesives, particularly hot melt adhesives, based on propylene copolymers and cyclopentadiene-based hydrocarbon resins and/or crystalline polymers.

2. BACKGROUND

REXTAC™ APAO polymers are known to be useful in hot melt adhesive applications both alone and as blends with tackifiers and/or other polymers. Text from Huntsman Polymers' (part of Huntsman Corporation in Houston, Tex.) web-site of www.huntsman.com (as printed on Mar. 19, 2002) includes the statement that:

"REXtac® APAO polymers provide an excellent base for the manufacture of a wide variety of hot melt adhesive and sealant systems. The compatibility of these amorphous polyolefins with many solvents, tackifiers, waxes, and other polymers make them suitable for many adhesive applications in packaging, construction, medical, and personal care applications. The chemical resistance and moisture barrier properties of REXtac® APAO also make it the choice for many sealant formulations where these properties help solve difficult applications."

Further, the Huntsman web-site discloses that RT 2730 and RT 2725 are both butene-1 copolymers and are useful in hot melt adhesive applications. Nothing in the web-site however discloses that specific hydrocarbon resins or blends with other polymers can improve adhesive performance.

Other references have disclosed other amorphous polymers useful in adhesive applications. Examples include EP 442 045 (A2), which discloses sprayable hot melt adhesives of amorphous polyalphaolefins having 3 to 75 weight % $C_4$ to $C_{10}$ alpha-olefin, 25 to 95 weight % propylene and 0 to 20 weight % ethylene; and WO 00/146277 and WO 00/46278, which disclose metallocene based polyalphaolefin inter-polymers and adhesives thereof.

In addition, REXTAC™ APAO polymers are known to be useful in hot melt adhesive applications both alone and as blends with other polymers.

U.S. Pat. No. 5,468,807 discloses blends of REXTAC 2780 with POLYPROPYLENE RF355B having an MFR of 2.7. However, this reference does not disclose that polypropylene having a viscosity of 1500 mPa.s or less at 190° C. can be used successfully in an adhesive composition.

Other references of interest include U.S. Pat. Nos. 6,156,856; 6,160,071; 4,642,269; 5,854,354; 6,084,048; 4,950,720; 5,468,807; 6,180,229; 6,114,261; and 6,121,401; and European Patent Nos. EP 622380(B1), EP 769505 (B1) and EP 685495(B13).

3. SUMMARY OF THE INVENTION

This invention relates to an adhesive comprising:

(a) a copolymer comprising butene, at least 40 mole % propylene, and from 0 to 30 mole % of a termonomer selected from the group consisting of ethylene and $C_5$ to $C_{20}$ linear, branched or cyclic alpha olefins, wherein the copolymer has (i) a weight average molecular weight of 100,000 or less; (ii) a number average molecular weight of 20,000 or less; (iii) an Mw/Mn of 5 or more; and (iv) a viscosity of 8000 mPa.s or less at 190° C.;

(b) a hydrocarbon resin; and/or (c) a polypropylene having at least 30% crystallinity having a viscosity of 1500 mPa.s or less at 190° C., or a tactic polypropylene having a viscosity of 1500 mPa.s or less at 190° C., provided that if the tactic polypropylene is not present, then the hydrocarbon resin comprises a cyclopentadiene-based hydrocarbon resin.

For purposes of this invention and the claims thereto, "copolymer" is defined to be an inter-polymer having two or more monomers.

4. DETAILED DESCRIPTION

In a preferred embodiment this invention relates to an adhesive comprising:

(a) a copolymer comprising butene, at least 40 mole % propylene, and from 0 to 30 mole % of a termonomer selected from the group consisting of ethylene and $C_5$ to $C_{20}$ linear, branched or cyclic alpha olefins, wherein the copolymer has (i) a weight average molecular weight of 100,000 or less; (ii) a number average molecular weight of 20,000 or less; (iii) an Mw/Mn of 5 or more; and (iv) a viscosity of 8000 mPa.s or less at 190° C.; and (b) a cyclopentadiene-based hydrocarbon resin, preferably having a ring and ball softening point of 150° C. or less.

In another preferred embodiment, this invention also relates to an adhesive comprising:

(a) a copolymer comprising butene, at least 40 mole % propylene, and from 0 to 30 mole % of a termonomer selected from the group consisting of ethylene, and $C_5$ to $C_{20}$ linear, branched or cyclic alpha olefins, wherein the copolymer has (i) a weight average molecular weight of 100,000 or less; (ii) a number average molecular weight of 20,000 or less; (iii) an Mw/Mn of 5 or more; and (iv) a viscosity of 8000 mPa.s or less at 190° C.;

(b) a polypropylene having at least 30% crystallinity having a viscosity of 1500 mPa.s at 190° C., or less or a tactic polypropylene having a viscosity of 1500 mPa.s at 190° C. or less; and (c) a hydrocarbon resin, preferably having a ring and ball softening point of 150° C. or less.

In another preferred embodiment, this invention also relates to an adhesive comprising:

(a) a copolymer comprising butene, at least 40 mole % propylene, and from 0 to 30 mole % of a termonomer selected from the group consisting of ethylene and $C_5$ to $C_{20}$ linear, branched or cyclic alpha olefins, wherein the copolymer has (i) a weight average molecular weight of 100,000 or less; (ii) a number average molecular weight of 20,000 or less; (iii) an Mw/Mn of 5 or more; and (iv) a viscosity of 8000 mPa.s or less at 190° C.; and (b) a polypropylene having at least 30% crystallinity having a viscosity of 1500 mPa.s at 190° C. or less or a tactic polypropylene having a viscosity of 1500 mPa.s at 190° C. or less.

In another preferred embodiment, this invention also relates to an adhesive comprising:

(a) a copolymer comprising butene and at least 40 mole % propylene, wherein the copolymer has (i) a weight average molecular weight of 100,000 or less; (ii) a number average molecular weight of 20,000 or less; (iii) an Mw/Mn of 5 or more; and (iv) a viscosity of 8000 mPa.s or less at 190° C.;

(b) a cyclopentadiene-based hydrocarbon resin; and (c) a polypropylene having at least 30% crystallinity having a viscosity of 1500 mPa.s or less at 190° C. In another preferred embodiment, the copolymer described above comprises a copolymer wherein (independently of each other):

the propylene is present in the copolymer at 40 to 90 mole %, preferably 55 to 75 mole %, more preferably 60 to 70 mole %;

the butene is present in the copolymer at 10 to 60 mole %, preferably 25 to 45 mole %, more preferably 30 to 40 mole %; and the termonomer is present in the copolymer at 0 to 15 mole %, preferably 0.5 to 10 mole %, preferably 0.75 to 5 mole %, more preferably 1 to 4 mole %.

In a preferred embodiment, the copolymers used in this invention have a weight average molecular weight of 5,000 to 100,000, preferably 20,000 to 70,000, preferably 40,000 to 60,000.

In another embodiment, the copolymers used in this invention have a number average molecular weight of 500 to 20,000, preferably 1000 to 10,000, more preferably 5000 to 9000.

In another embodiment, the copolymers used in this invention have an Mw/Mn of 5 or more, preferably 6 or more, more preferably 7 or more, more preferably between 5 and 10, more preferably between 6 and 10, more preferably between 7 and 9.

In a preferred embodiment, the termonomer is selected from the group consisting of ethylene and $C_5$ to $C_{20}$ linear, branched or cyclic alpha olefins or $C_4$ to $C_{20}$ alpha, omega dienes, and is preferably one or more of ethylene, pentene, hexene, heptene, octene, nonene, decene, undecene, dodecene, 3,5,5-trimethyl hexene-1,3-methylpentene-1,4-methylpentene-1, vinyl norbornene, decadiene, dodecadiene, hexadecadiene, or hexadiene. In a preferred embodiment, the termonomer comprises ethylene, preferably at 5 mole % or less.

In another preferred embodiment, the copolymers used in this invention have a viscosity of 7000 mPa.s or less at 190° C. (as measured by ASTM D 3236 at 190° C.), preferably 5000 or less, preferably 4000 or less, more preferably 3000 or less.

Molecular weights (weight average molecular weight (Mw) and number average molecular weight (Mn)) are measured by Gel Permeation Chromatography using a Waters 150 Gel Permeation Chromatograph equipped with a differential refractive index detector and calibrated using polystyrene standards. Samples are run in either THF (45° C.) or in 1,2,4-trichlorobenzene (145° C.) depending upon the sample's solubility using three Shodex GPC AT-80 M/S columns in series. This general technique is discussed in "Liquid Chromatography of Polymers and Related Materials III", J. Cazes Ed., Marcel Decker, 1981, page 207. No corrections for column spreading are employed; however, data on generally accepted standards, e.g. National Bureau of Standards Polyethylene 1475, should be used to establish a precision with 0.1 units for Mw/Mn calculated from elution times. The numerical analyses are performed using Expert Ease software available from Waters Corporation.

In another embodiment, the copolymers of this invention have less than 30% crystallinity, preferably less than 20% crystallinity, preferably less than 15% crystallinity, even more preferably 10% or less crystallinity. In another embodiment, the copolymer has a crystallinity of between 10 and 0.5%.

Crystallinity is to be determined using the procedure described as follows. A predetermined amount of sample is pressed at approximately 150° C. to 200° C. to form a film of about 150 μm thick. A central piece of the film (preferably 7 to 12 mg) is removed with a punch die and annealed for 120 hours at room temperature. Thereafter, DSC data is obtained (TA Instruments 2920 temperature modulated DSC) by cooling the sample at −50° C. and subsequently heating it at 10° C./min to 150° C. where it stays isothermally for 5 min before a second cooling-heating cycle is applied. Both the first and second cycle thermal events are recorded. The maximum melting peak is recorded as Tm and the area under the endothermic transition is used to calculate the crystallinity percent. The crystallinity percent is calculated using the formula, [area under the curve (J/g)/(B (J/g))]*100. A value of B of 165 J/g is used for those polymers where propylene is the major component. Otherwise, a value of B that is derived from the homopolymer of the major polymer component must be used. These values for B are found in the Polymer Handbook, Fourth Edition, published by John Wiley and Sons, New York, 1999.

In another preferred embodiment, the copolymers of this invention are at least 70% amorphous, preferably between 80 and 100% amorphous, even more preferably between 90 and 100% amorphous. Percent amorphous content is determined by Differential Scanning Calorimetry measurement according to ASTM E 794-85. The term amorphous refers to the substantial absence of crystallinity in the polymer; for polypropylene homopolymer this means that the polymer is atactic, without isotactic segments giving rise to crystallinity, as can be determined by the absence of a melting point and/or a heat of fusion of less than 15 J/g by DSC, preferably 10 J/g or less. Atactic polymers are defined as having no consistent patterns among chiral sequences [Mark H., Bikales N., Encyclopedia of Polymer Science and Engineering, Volume 9, John Wiley & Sons Inc, 1987, page 8001 as can be determined by $^{13}C$ NMR; Karger-Kocsis J., Polypropylene, Structure blends and composites, 1. Structure and Morphology, Chapman & Hall, 1995, pages1 5-I 91]. For purposes of this invention and the claims thereto, amorphous is defined to be having a heat of fusion of 10 J/g or less as measured by Differential Scanning Calorimetry, (DSC).

DSC peak melting point and heat of fusion are determined using a procedure described as follows. A predetermined amount of sample is pressed at approximately 150° C. to 200° C. to form a film 150 μm thick. A central piece of the film (preferably 7 to 12 mg) is removed with a punch die and annealed for 120 hours at room temperature. A TA Instruments 2920 temperature modulated DSC can be used and film is cooled at −50 ° C. and subsequently heated it at 10° C./min to 150° C. where it stays isothermally for 5 min before a second cooling-heating cycle is applied. Both the first and second cycle thermal events are recorded. The maximum melting peak is recorded as Tm and the area under the endothermic transition is used to calculate the heat of fusion.

In another embodiment, the copolymers of this invention have a glass transition temperature (Tg) as measured by ASTM E 1356 of −5° C. or less, preferably −10° C. or less, preferably −15° C. or less, more preferably between −5° C. and −40° C., more preferably between −15° C. and −30° C.

Synthesis

The copolymers used in this invention can be prepared by known means using known Ziegler-Natta type catalysts.

Preferred copolymers used in this invention may be purchased from Huntsman Chemical Company in Salt Lake City, Utah, under the tradename REXTAC™.

A preferred example of a terpolymer useful in this invention is REXTAC™ 2715, which is an inter-polymer of propylene, butene and ethylene having about 67.5 mol % propylene, about 30.5 mol % butene and about 2 mol % ethylene, produced by Huntsman Company. The melting point is 76° C. with a melting range from 23 to 124° C. The Tg is −22° C., the crystallinity is about 7%, and the enthalpy is 11 J/g by DSC. The Mn is 6630, the Mw is 51200 and the Mz 166,700 by GPC. Mw/Mn is 7.7.

Another preferred example of a terpolymer useful in this invention is REXTAC™ 2730, which is an inter-polymer of propylene, butene and ethylene having about 67.5 mol % propylene, about 30.5 mol % butene and about 2 mol % ethylene, produced by Huntsman Company. The melting point is 70° C. with a melting range from 25 to 116° C. The Tg is −25° C., the crystallinity is about 7%, the enthalpy is about 10 J/g by DSC. The Mn is 8260, the Mw is 59100 and the Mz 187900 by GPC. Mw/Mn is 7.15.

Even though preferred embodiments described above are listed as REXTAC™ polymers, any propylene polymer having the listed characteristics will also perform in this invention. Other examples include Vestoplast™ type polymers available from Creanova, Inc. (formerly Degussa Huls) located in Germany, and Eastoflex™ type polymers available from Eastman Chemicals in Longview, Tex.

Polypropylene Having a Crystallinity of 30% or More

In some embodiments, the copolymer is blended with a polypropylene having a crystallinity of at least 30%, preferably between 40% and 95%, more preferably between 45% and 80%, and an optional hydrocarbon resin above, to form an adhesive. Preferred polypropylenes include propylene homopolymers and copolymers made by Ziegler-Natta catalyst systems or made by metallocene based catalyst systems (as described below). Typical comonomers used in the propylene copolymers include ethylene and $C_4$ to $C_{20}$ olefins. The polypropylene preferably has a viscosity between 50–1000 mPa.s at 190 ° C., preferably between 100–500 mPa.s at 190° C., more preferably between 150 and 300 mPa.s at 190° C. In another embodiment, the polypropylene has a melting point (Tm) of 150° C. or less, preferably 130° C. or less, preferably 120° C. or less. Crystallinity is measured as described above.

Tactic Polypropylene

In some embodiments, the copolymer is blended with a tactic polypropylene (such as isotactic polypropylene, syndiotactic polypropylene or a combination thereof) and a hydrocarbon resin as explained below to form an adhesive. Preferred tactic polypropylenes include isotactic and syndiotactic propylene homopolymers and copolymers made by Ziegler-Natta catalyst systems or made by metallocene-based catalyst systems. Typical comonomers used in the propylene copolymers include ethylene and $C_4$ to $C_{20}$ olefins. The tactic polypropylene preferably has a viscosity between 50–1000 mPa.s at 190° C., preferably between 100–500 mPa.s at 190° C., more preferably between 150 and 300 mPa.s at 190° C. In another embodiment, the tactic polypropylene has a melting point (Tm) of 150° C. or less, preferably 130° C. or less, preferably 120° C. or less.

In a preferred embodiment, the tactic polypropylene comprises isotactic polypropylene having a viscosity between 50–1000 mPa.s at 190° C., preferably between 100–500 mPa.s at 190° C., more preferably between 150 and 300 mPa.s at 190° C. In another embodiment the tactic polypropylene comprises isotactic polypropylene having a viscosity between 50–1000 mPa.s at 190° C., preferably between 100–500 mPa.s at 190° C., more preferably between 150 and 300 mPa.s at 190° C. and has a melting point (Tm) of 150° C. or less, preferably 130° C. or less, preferably 120° C. or less.

In a preferred embodiment, the tactic polypropylene comprises syndiotactic polypropylene having a viscosity between 50–1000 mPa.s at 190° C., preferably between 100–500 mPa.s at 190° C., more preferably between 150 and 300 mPa.s at 190° C. In another embodiment the tactic polypropylene comprises isotactic polypropylene having a viscosity between 50–1000 mPa.s at 190° C., preferably between 100–500 mPa.s at 190° C., more preferably between 150 and 300 mPa.s at 190° C. and has a Tm of 140° C. or less, preferably 130° C. or less, more preferably 120° C. or less. Preferred tactic polypropylene may have a crystallinity of 30% or more, preferably 35% or more, more preferably 40% or more.

To make preferred tactic polymers or polymers having 30% or more crystallinity, one can take any catalyst known to produce tactic or crystalline polymer and polymerize olefins under conditions to produce lower molecular weights, such as high temperatures optionally combined with use of small amounts hydrogen.

In general the polymerization is conducted using a stereospecific metallocene catalyst capable of producing stereoregular polypropylene, activated with MAO or a non-coordinating anion (NCA) activator, and optionally a scavenging compound. Polymerization is conducted in a solution, slurry or gas phase, preferably in solution phase. The polymerization can be performed in a single reactor process. A slurry or solution polymerization process can utilize sub- or superatmospheric pressures and temperatures in the range of from −25° C. to 150° C. In a slurry polymerization, a suspension of solid, particulate polymer is formed in a liquid polymerization medium to which propylene, catalyst and optionally hydrogen are added. In solution polymerization, the liquid medium serves as a solvent for the polymer. The liquid employed as the polymerization medium can be an alkane or a cycloalkane, such as butane, pentane, hexane, or cylclohexane, or an aromatic hydrocarbon, such as toluene, ethylbenzene or xylene. For slurry polymerization, liquid monomer can also be used. The medium employed should be liquid under the conditions of the polymerization and relatively inert. Preferably, hexane or toluene is employed for solution polymerization. Gas phase polymerization processes are described in U.S. Pat. Nos. 4,543,399, 4,588,790, 5,028,670. The catalyst may be supported on any suitable particulate material or porous carrier such as polymeric supports or inorganic oxides, for example, silica, alumina or both. Methods of supporting metallocene catalysts are described in U.S. Pat. Nos. 4,808,561, 4,897,455, 4,937,301, 4,937,217, 4,912,075, 5,008,228, 5,086,025, 5,147,949, and 5,238,892.

A specific example of how to make such a tactic polymer is as follows: 400 mL of purified and degassed toluene is transferred into a stainless steel autoclave reactor with internal capacity of 1000 mL. The reactor is maintained under slight positive argon atmosphere at all times. 2.0 mL solution of 10% wt. methylalumoxane in toluene is transferred into the autoclave. The mixture is stirred until stable pressure. The reactor is maintained at a slightly positive pressure. In succession, 100 g of prepurified propylene is added under stirring. The reactor mixture is heated to 120° C. At this reactor temperature, premixed and sufficiently aged 1.0 mL dimethylsilyl-bis(2-methyl-indenyl)zirconium dichloride (mg/mL of toluene) and 2 mL solution of 10 wt. % methylaluminoxane in toluene are placed in the reactor. The polymerization is conducted for 30 minutes. Thereafter, the reactor is cooled down and vented to the atmosphere. The product is precipitated in slightly acidified methanol. Thereafter, the product is washed, filtered and dried under reduced pressure for 24 hr.

Catalyst compounds capable of producing polymer having a crystallinity of 30% or more, or a tactic propylene having an Mw of 30,000 or less and a crystallinity of 30% or more which can be used in this invention, (also called stereospecific catalysts) are described in U.S. application Ser. No. 60/067,783, filed Dec. 10, 1997. Typically used catalysts are stereorigid, chiral or asymmetric, bridged metallocenes. See, for example, U.S. Pat. Nos. 4,892,851; 5,017,714; 5,132,281; 5,155,080; 5,296,434; 5,278,264 and 5,318,935; WO-A-(PCT/US92/10066); WO-A-93/19103; EP-A2-0 577 581; EP-A1-0 578 838; and academic literature "The Influence of Aromatic Substituents on the Polymerization Behavior of Bridged Zirconocene Catalysts", Spaleck, W., et al, Organometallics 13, 954–963 (1994); and "ansa-Zirconocene Polymerization Catalysts with Annelated Ring Ligands-Effects on Catalytic Activity and Polymer Chain Lengths", Brinzinger, H., et al, Organometallics 13, 964–970 (1994) and documents referred to therein. In a preferred embodiment, the stereospecific transition metal catalyst compound is a dimethylsilyl-bridged bis(indenyl) zirconocene or hafnocene. More preferably, the transition metal catalyst compound is dimethylsilyl (2-methyl-4-phenylindenyl) zirconium or hafnium dichloride or dimethyl. In another preferred embodiment, the transition metal catalyst is a dimethylsilyl-bridged bis(indenyl) hafnocene such as dimethylsilyl bis(indenyl)hafnium dimethyl or dichloride. Illustrative, but not limiting examples of preferred stereospecific metallocene catalysts are the racemic isomers of:

[dimethylsilanediylbis(2-methyl-4-phenylindenyl)]metal dichloride;

[dimethylsilanediylbis(2-methylindenyl)]metal dichloride;

[dimethylsilanediylbis(indenyl)]metal dichloride;

[dimethylsilanediylbis(indenyl)]metal dimethyl;

[dimethylsilanediylbis(tetrahydroindenyl)]metal dichloride;

[dimethylsilanediylbis(tetrahydroindenyl)]metal dimethyl;

[dimethylsilanediylbis(indenyl)]metal diethyl; and

[dibenzylsilanediylbis(indenyl)]metal dimethyl;

wherein the metal can be chosen from Zr, Hf, or Ti, preferably Zr.

For solution polymerization with the above catalyst compounds, the solution preferably comprises a hydrocarbon solvent. More preferably, the hydrocarbon solvent is aromatic. Also, the propylene monomers are preferably contacted at a temperature from 95° C. to 115° C. More preferably, a temperature from 100° C. to 110° C. is used. Most preferably, the propylene monomers are contacted at a temperature from 105° C. to 110° C. The pressures of the reaction generally can vary from atmospheric to 345 MPa, preferably to 182 MPa. The reactions can be run batchwise or continuously. Conditions for suitable slurry-type reactions can be similar to solution conditions, the polymerization typically being run in liquid propylene under pressures suitable to such.

Hydrocarbon Resins

Hydrocarbon resins useful in this invention include those hydrocarbon resins known in the art. Examples include, but are not limited to, aliphatic hydrocarbon resins, aromatic modified aliphatic hydrocarbon resins, hydrogenated polycyclopentadiene resins, polycyclopentadiene resins, gum rosins, gum rosin esters, wood rosins, wood rosin esters, tall oil rosins, tall oil rosin esters, polyterpenes, aromatic modified polyterpenes, terpene phenolics, aromatic modified hydrogenated polycyclopentadiene resins, hydrogenated aliphatic resins, hydrogenated aliphatic aromatic resins, hydrogenated terpenes and modified terpenes, and hydrogenated rosin esters. In some embodiments the tackifier is hydrogenated. In other embodiments the tackifier is non-polar. (Non-polar meaning that the tackifier is substantially free of monomers having polar groups. Preferably the polar groups are not present; however, if they are, preferably they are not present at more that 5 weight %, preferably not more that 2 weight %, even more preferably no more than 0.5 weight %.) In some embodiments the tackifier has a softening point (Ring and Ball, as measured by ASTM E-28) of 80° C. to 150° C., preferably 100° C. to 150° C.

Cylopentadiene-Based Hydrocarbon Resin

Preferred cyclopentadiene-based hydrocarbon resins for use in the invention include thermally polymerized, hydrogenated hydrocarbon tackifier resin which is a copolymer of a feedstock comprising a mixture of a vinyl aromatic stream containing styrene, alkyl substituted derivatives of styrene (such as alpha-methyl styrene), indene and alkyl substituted derivatives of indene; a cyclodiene stream comprising monomers, dimers and codimers of cyclopentadiene and alkyl substituted derivatives of cyclopentadiene; and optionally a $C_4$–$C_5$ acyclic diene stream.

In particular, the present invention can utilize a thermally polymerized, hydrogenated hydrocarbon tackifier resin which is a copolymer of a feedstock which comprises 100 parts of a vinyl aromatic stream containing styrene and indene and alkyl substituted derivatives thereof; 10 to 1000 parts of a cyclodiene stream comprising monomers, dimers and codimers of cyclopentadiene and alkyl substituted derivatives of cyclopentadiene; and optionally 0 to 100 parts of a $C_4$–$C_5$ acyclic diene stream.

A typical vinyl aromatic stream used to produce resins useful in the present invention has a composition of 7 wt % styrene; 30 wt % alkyl substituted derivatives of styrene, 13 wt % indene, 9 wt % alkyl substituted derivatives of indene and 41 wt % non-reactive aromatic components. The vinyl aromatic stream is obtained by steam cracking petroleum refinery streams and separating the fraction boiling in the range of 135° to 220° C. by fractional distillation.

A useful cyclodiene stream to make resins useful in the present invention comprises monomers, dimers and codimers of cyclopentadiene, and alkyl substituted derivatives of cyclopentadiene. This component of the feedstock is obtained by steam cracking petroleum refinery streams, separating a $C_5$–$C_6$ fraction boiling in the range of 30°–80° C., heat soaking to dimerize and codimerize the cyclopentadiene and alkyl substituted cyclopentadienes and distilling to remove unreacted $C_5$–$C_6$ components.

Two components of the feedstock, the vinyl aromatic stream and the cyclodiene stream, are combined in a mixture having about 100 parts vinyl aromatic components and 10 to 1000 parts cyclodiene component. A preferred mixture of vinyl aromatic and cyclodiene components is 100 parts vinyl aromatic component to 50–80 parts cyclodiene component, preferably 60–70 parts, preferably about 66 parts. The feed mixture may also include a non-reactive polymerization diluent, such as toluene. The feed mixture may optionally contain up to 100 parts of an acyclic diene component. The resin feedstock mixture may be thermally polymerized at a temperature between 1600 and 320° C., preferably from 250°–290° C., for a period of 10 to 500 minutes, preferably 60–180 minutes. The resin solution that results from the thermal polymerization is stripped of solvent and unreacted monomers by heating to a temperature of from 150° –300° C., with or without the injection of steam. The resultant resin typically exhibits the following properties: softening point from 80° to 200° C., weight average molecular weight (Mw) by GPC from 300–1000, number average molecular weight (Mn) from 100–500, and dark color.

The resin is then hydrogenated to a level where the resultant resin contains about 1% to 20% aromatic hydrogens as measured by $^1$H-NMR. Hydrogenation may be by any means known in the art, such as is shown in U.S. Pat. No. 5,820,749, and in European patent nos. EP 0 516 733; and EP 0 046 634. Following hydrogenation, the resin can be stripped to softening points ranging from 70°–200° C., preferably 70°–130° C. The resultant hydrogenated resins preferably exhibit the following properties: weight average molecular weight (Mw) by GPC from 300–1000, number average molecular weight (Mn) from 100–500, a Mw/Mn ratio of about 2.1 and a Saybolt color of 23–30.

The presence of the olefinic diluent allows the hydrogenation reactor to achieve a desirable rapid increase in temperature early in the hydrogenation run. The rapid increase in temperature results from the rapid exothermic hydrogenation reaction of converting the olefinic diluent to a paraffin. The amount of olefinic diluent used should be such that the exothermic reaction increases the hydrogenation reactor temperature by 40° to 140° C. Preferably, the temperature increase should be in the range of 80°–110° C. The desired peak temperature in the hydrogenation reactor should be in the range of 280°–320° C. when the olefinic diluent is used in a hydrogenation reactor having an inlet temperature ranging from 180°–240° C. The olefinic diluent may be any olefin, preferably a mono-olefin, having 3 to 20 carbon atoms, preferably 5 to 12 carbon atoms. The solvent diluent may be any saturated hydrocarbon solvent, preferably aliphatic or cycloaliphatic in nature. The solution that results from the hydrogenation process is stripped of solvent and oligomeric material by heating to temperatures of from 150°–350° C., with or without the injection of steam.

The hydrogenation may be achieved in the presence of any of the known catalysts commonly used for hydrogenating petroleum resins. The catalysts which may be used in the hydrogenation step include the Group 10 metals such as nickel, palladium, ruthenium, rhodium, cobalt and platinum, the Group 6 metals such as tungsten, chromium and molybdenum, and the Group 11 metals such as rhenium, manganese and copper. These metals may be used singularly or in a combination of two or more metals, in the metallic form or in an activated form, and may be used directly or carried on a solid support such as alumina or silica-alumina. A preferred catalyst is one comprising sulfided nickel-tungsten on a gamma-alumina support having a fresh catalyst surface area ranging from 120–300 $m^2/g$ and containing from 2–10% by weight nickel and from 10–25% by weight tungsten as described in U.S. Pat. No. 4,629,766. The hydrogenation is carried out with a hydrogen pressure of 20–300 atmospheres, preferably 150–250 atmospheres.

Examples of hydrocarbon resins useful in this invention include Escorez™ 5000 series resins sold by ExxonMobil Chemical Company in Baton Rouge, La. Further examples of hydrocarbon resins useful in this invention include Arkon™ series resins sold by Arakawa Europe in Germany. Yet more examples of hydrocarbon resins useful in this invention include the Eastotac™ series of resins sold by Eastman Chemical Company in Longview, Tex.

Formulations of the Polymers

In the present description as well as in the claims, unless indicated otherwise a general reference to "polypropylene" is intended to refer to component (c) of the adhesive according to the present invention in general, wherein component (c) can either be the polypropylene having at least 30% crystallinity having a viscosity of 1500 mPa.s or less at 190° C. or the tactic polypropylene having a viscosity of 1500 mPa.s or less at 190° C.

In a preferred embodiment, the copolymer, optional polypropylene, and hydrocarbon resin(s) are combined where the copolymer and the polypropylene, if any, are present at 50 weight % or more, more preferably 75 weight % or more, more preferably 85 weight % or more, more preferably 90 weight % or more. In a preferred embodiment, the resin(s) are present at 50 weight % or less, more preferably 25 weight % or less, more preferably 15 weight % or less, more preferably 10 weight % or less. The polypropylene, if present, is typically present at up to 50 weight %, based upon the weight of the copolymer and the tactic polypropylene, preferably at up to 35 weight %, more preferably at up to 30 weight %, more preferably between 10 and 30 weight %.

When the cyclopentadiene-based hydrocarbon resin is present in the adhesives of this invention, other tackifiers may also be present. Additional tackifiers may be blended with the copolymer/cyclopentadiene based hydrocarbon resin combination described above. Examples include, but are not limited to, aliphatic hydrocarbon resins, aromatic modified aliphatic hydrocarbon resins, gum rosins, gum rosin esters, wood rosins, wood rosin esters, tall oil rosins, tall oil rosin esters, polyterpenes, aromatic modified polyterpenes, terpene phenolics, hydrogenated aliphatic resins, hydrogenated aliphatic aromatic resins, hydrogenated terpenes and modified terpenes, and hydrogenated rosin esters. The additional tackifier, if present, is typically present at about 1 weight % to about 50 weight %, based upon the weight of the blend, more preferably 10 weight % to 40 weight %, even more preferably 20 weight % to 40 weight % or 20 weight % to 30 weight %.

In another embodiment, the copolymer is blended with the polypropylene described with small amounts of or without the hydrocarbon resin. In a preferred embodiment, the hydrocarbon resin is present at less than 10 weight %, preferably at 7 weight % or less, preferably at 5 weight % or less, preferably at 3 weight % or less, more preferably at 1 weight % or less, preferably at 0 weight %. Preferably the hydrocarbon resin is absent.

In a preferred embodiment, the adhesive composition of this invention comprises the copolymer described above, the cyclopentadiene-based hydrocarbon resin described above, an isotactic polypropylene having a viscosity of 1500 mPa.s or less at 190° C., and another hydrocarbon resin selected from the group consisting of aliphatic hydrocarbon resins, aromatic modified aliphatic hydrocarbon resins, hydrogenated polycyclopentadiene resins, polycyclopentadiene resins, gum rosins, gum rosin esters, wood rosins, wood rosin esters, tall oil rosins, tall oil rosin esters, polyterpenes, aromatic modified polyterpenes, terpene phenolics, aromatic modified hydrogenated polycyclopentadiene resins, hydrogenated aliphatic resins, hydrogenated aliphatic aromatic resins, hydrogenated terpenes and modified terpenes, and hydrogenated rosin esters. In another embodiment the copolymer comprises one or more dienes.

In a preferred embodiment, the combinations described above are combined with less than 3 wt % antioxidant, less than 25 wt % flow improver, less than 25 wt % wax, and/or less than 3 wt % crystallization aid.

Another optional component of the copolymer/resin composition is a plasticizer or another additives such as oils, surfactants, fillers, and color masterbatches. Preferred plasticizers include mineral oils, polybutenes, and phthalates. Particularly preferred plasticizers include phthalates such as diisoundecyl phthalate (DIUP), diisononylphthalate (DINP), dioctylphthalates and (DOP). Particularly preferred oils include aliphatic naphthenic oils.

Another optional component of copolymer/resin composition is a low molecular weight product such as wax, functionalized wax, oil or low Mn polymer (low meaning below Mn of 5000, preferably below 4000, more preferably below 3000, even more preferably below 2500). Preferred oils include aliphatic naphthenic oils, and white oils. Preferred low Mn polymers include polymers of lower alpha olefins such as propylene, butene, pentene, and hexene. A particularly preferred polymer includes polybutene having an Mn of less than 1000. An example of such a polymer is available under the trade name VISTANEX PAR™ 950 from Infineum in Houston Texas. VISTANEX PAR™ 950 is a liquid polybutene polymer having an Mn of 950 and a kinematic viscosity of 220 cSt at 100° C., as measured by ASTM D 445.

The adhesives are prepared by techniques known in the art such as melt blending, sigma blade mixing, screw extrusion, high speed molten mixing, and turbine blade mixing.

In a preferred embodiment the adhesives produced in this invention have a viscosity of 5000 mPa.s or less at 190° C. (as measured by ASTM D 3236 at 190° C.); preferably 5000 or less, preferably 4000 or less, more preferably 3000 or less, more preferably 2000 or less, even more preferably 1000 or less.

The adhesive compositions may be applied to the desired substrate or adhered in any manner known in the art, particularly those methods used traditionally for packaging. Typically, a coating head or nozzle, with associated equipment, for example those manufactured by Nordson Corporation, Duluth, Ga., are used. The compositions can be applied as fine lines, dots or spray coatings, in addition to other traditional forms as desired.

The composition may then be applied directly to a substrate as an adhesive (such as a hot melt adhesive) or may be sprayed thereon. Spraying is defined to include atomizing, such as producing an even dot pattern, spiral spraying, such as Nordson Controlled Fiberization or oscillating a stretched filament as is done in the ITW Dynafiber/Omega heads or Summit technology from Nordson, as well as melt blown techniques. Melt blown techniques are defined to include the methods described in U.S. Pat. No. 5,145,689 or any process where air streams are used to break up filaments of the extrudate and then used to deposit the broken filaments on a substrate. In general, melt blown techniques are processes that use air to spin hot melt adhesive fibers and convey them onto a substrate for bonding. Fiber sizes can easily be controlled from 20–200 $\mu$m by changing the melt to air ratio. Few, preferably no, stray fibers are generated due to the inherent stability of adhesive melt blown applicators. Under UV light the bonding appears as a regular, smooth, stretched dot pattern. Atomization is a process that uses air to atomize hot melt adhesive into very small dots and convey them onto a substrate for bonding.

The adhesives of this invention can be used for disposable diaper and napkin chassis construction, elastic attachment in disposable goods converting, packaging, labeling, bookbinding, woodworking, and other assembly applications. Particularly preferred applications include: baby diaper leg elastic, diaper frontal tape, diaper standing leg cuff, diaper chassis construction, diaper core stabilization, diaper liquid transfer layer, diaper outer cover lamination, diaper elastic cuff lamination, feminine napkin core stabilization, feminine napkin adhesive strip, industrial filtration bonding, industrial filter material lamination, filter mask lamination, surgical gown lamination, surgical drape lamination, film lamination and perishable products packaging.

5. EXAMPLES

Tests and Materials.

All molecular weights are weight average unless otherwise noted.

DSC-peak melting point (Tm) and crystallinity were determined as follows. A predetermined amount of sample pressed at approximately 150° C. to 200° C. to form a film 150 $\mu$m thick. A central piece of the film (preferably 7 to 12 mg) is removed with a punch die and annealed for 120 hours at room temperature. Thereafter, DSC data was obtained (TA Instruments 2920 temperature modulated DSC) by cooling the sample at −50° C. and subsequently heating it at 10° C./min to 150° C. where it stays isothermally for 5 min before a second cooling-heating cycle is applied. Both the first and second cycle thermal events are recorded. The Tg is taken as the inflection point of the step change on the baseline of the DSC described on the DSC thermogram. The maximum crystallization peak is recorded as Tc. The maximum melting peak is recorded as Tm and the area under the endothermic transition is used to calculate the crystallinity percent. The crystallinity percent was calculated using the formula [area under the curve (J/g)/(165 J/g)]*100.

Adhesive Testing

A number of hot melt adhesive compositions were prepared by blending the polymer, tackifier, antioxidant, and other ingredients such as plasticizer oil, wax, and liquid resin tackifiers, under low or high shear mixing at elevated temperatures to form a fluid melt. Mixing temperatures varied from about 130° C. to about 200° C., preferably from about 150° C. to about 190° C. Adhesive test specimens were created by bonding the substrates together with a drop of molten adhesive and compressing the bond with a 500 g weight until cooled to room temperature. In evaluating the performance characteristics of the adhesive compositions, test procedures "a" through "d" were employed:

(a) Adhesive Melt Viscosity (ASTM D-3236): Melt viscosities were measured at 190° C. using a Brookfield Thermosel viscometer (mPa.s).

(b) Aged Peel Strength (modified ASTM D1876): Bond Specimens were prepared as 1 inch by 3 inch (2.5 cm by 7.6 cm) specimens of adhesive between polyester film and Mylar. These adhesive constructs were then aged in an ASTM room at constant temperature and humidity (77° C., 50% relative humidity) for 3 days. Bond specimens were peeled back at 180 degrees (T-Peel Type) in a tensile tester at a constant crosshead speed of 2 in/min (5 cm/min). The average peak force required to peel the bond (4 specimens) apart was recorded. The method of bond failure, whether it was adhesive (AF) or Cohesive (CF) rupture, was also recorded.

(c) Shear Adhesion Fail Temperature (SAFT) (modified ASTM D4498) measures the ability of a bond to withstand an elevated temperature rising at 60°C./15 min., under a constant force that pulls the bond in the shear mode. Bonds were formed on 1 inch by 3 inch (2.5 cm by 7.6 cm) specimens made from Kraft paper. The test specimens were suspended vertically in an oven at room temperature with a 500 gram load attached to the bottom. The temperature was then raised. The temperature at which the weight fell was recorded. Adhesives possessing high failure temperature are essential for the assembly of disposable articles or packaging goods that are often subjected to very high temperatures during storage and shipping.

(d) Initial Adhesion was determined by creating an adhesive construct or bond specimen of polyester to polyester and a molten drop of adhesive. The specimen was allowed to rest undisturbed for two minutes. The specimen was then examined for spontaneous adhesive failure, then pulled by hand to evaluate for cohesive failure or adhesive failure and qualitative resistance to the peeling of the specimen apart. Specimens that failed cohesively and with substantial resistance compared to standards were considered as good candidates for further aged or more elaborate testing such as described above.

REXTAC™ RT 2730 is a copolymer of propylene, butene and ethylene having about 67.5 mol % propylene, about 30.5 mol % butene and about 2 mol % ethylene, produced by Huntsman Company. The copolymer has about 15 mol % percent BB dyads, 43 mol % PB dyads and about 43 mol % PP dyads. The melting point is 70° C. with a melting range from 25 to 116° C. The Tg is −25° C., the crystallinity is about 7% and the enthalpy is 10 J/g by DSC. The Mn is 8260, the Mw is 59100 and the Mz 187900 by GPC. Mw/Mn is 7.15.

REXTAC™ RT 2715 is a copolymer of propylene, butene and ethylene having about 67.5 mol % propylene, about 30.5 mol % butene and about 2 mol % ethylene, produced by Huntsman Company. The copolymer has about 11 mol % BB dyads, 40 mol % PB dyads and about 49 mol % PP dyads. The melting point is 76° C. with a melting range form 23 to 124° C. The Tg is −22° C., the crystallinity is about 7%, and the enthalpy is 11 J/g by DSC. The Mn is 6630, the Mw is 51200 and the Mz 166,700 by GPC. Mw/Mn is 7.7.

ESCOREZ™ 5637 is a thermally polymerized aromatic modified cyclopentadiene based hydrogenated hydrocarbon resin having a ring and ball softening point of 130° C. commercially available from ExxonMobil Chemical Company in Baton Rouge, La.

IPP was made by the following procedure: 400 mL of purified and degassed toluene was transferred into a stainless steel autoclave reactor with internal capacity of 1000 mL. The reactor was maintained under slight positive argon atmosphere at all times. 2.0 mL solution of 10% wt. methylaluminoxane in toluene was transferred into the autoclave. The mixture was stirred until stable pressure. The reactor was maintained at a slightly positive pressure. In succession, 100 g of prepurified propylene was added under stirring. The reactor mixture was heated to 120° C. At this reactor temperature premixed and sufficiently aged 1.0 mL dimethylsilyl-bis(2-methyl-indenyl)zirconium dichloride (mg/mL of toluene) and 2 mL solution of 10 wt. % methylaluminoxane in toluene were placed in the reactor. The polymerization was conducted for 30 minutes. Thereafter, the reactor was cooled down, and vented to the atmosphere. The product, which was marginally soluble in warm toluene, was precipitated in slightly acidified methanol. Thereafter, the product was washed, filtered and dried under reduced pressure for 24 hr. The yield was 21.2 g. The polymer was analyzed by Gel Permeation Chromatography (GPC) using a Waters high temperature system running at 135° C. The molecular weight Mn showed a value of 12000, Mw of 26300 and MWD of 2.2. The DSC showed melting peak at 114° C., crystallization peak at 80° C. The glass transition was −13° C.

In the following examples, all parts, proportions and percentages are by weight unless otherwise indicated.

Although the examples may be directed to certain embodiments of the present invention, they are not to be viewed as limiting the invention in any specific respect.

Examples 1–6

Enough material to make up 10 g of the hot melt blends described in Table 1 were placed in a 50 mL beaker and were heated on a hot plate until the components were molten with stirring until uniform and were cooled to room temperature. Thereafter, 3–4 g of each hot melt was melted at a uniform temperature between 163° C. and 191° C. A drop of the liquid hot-melt was then transferred by eyedropper to the substrate and bond to create the adhesive construct. This test specimen was then tested according to the procedures described above. The results are reported in Table 1.

TABLE 1

| | 1 | 2 | 3 | 4 | 5 | 6 |
|---|---|---|---|---|---|---|
| REXTAC ™ 2730 | 100 | 90 | 50 | 70 | 80 | 50 |
| ESCOREZ ™ 5637 | 0 | 10 | 50 | 0 | 15 | 35 |
| IPP | 0 | 0 | 0 | 30 | 5 | 15 |
| Viscosity at 190° C. (mPa · s) | 3630 | 3165 | 1355 | 1550 | 2045 | 965 |
| Initial adhesion/Failure type | Good/CF | Exc/CF | Exc/CF | Good/CF | Good/CF | Good/CF |
| Aged adhesion (lbs)/ | 8.4 | 11.6 | 17.7 | 8.3 | 10.6 | 17.2 |
| Failure type | CF | CF | CF | CF | CF | CF |
| Shear Adhesion Failure Temp (° C.) | 70.6 | 72.8 | 72.8 | 88.9 | 66 | 63 |

In the Table, "CF" means cohesive failure; "AF" means adhesive failure; "Good" means resists nominal force provided by pulling by hand; and "Exc" means resists strong force provided by pulling by hand.

As is apparent from the foregoing general description and the specific embodiments, while forms of the invention have been illustrated and described, various modifications can be made without departing from the spirit and scope of the invention. Accordingly, it is not intended that the invention be limited thereby.

Various tradenames used herein are indicated by a ™ symbol, indicating that the names may be protected by certain trademark rights. Some such names may also be registered trademarks in various jurisdictions.

All patents, test procedures, and other documents cited herein, including priority documents, are fully incorporated by reference to the extent such disclosure is not inconsistent with this invention and for all jurisdictions in which such incorporation is permitted.

What is claimed is:

1. An adhesive comprising:

(a) a copolymer comprising butene, at least 40 mol % propylene, and from 0 to 30 mol % of a termonomer selected from the group consisting of ethylene and $C_5$ to $C_{20}$ linear, branched or cyclic alpha olefins, wherein the copolymer has (i) a weight average molecular weight of 100,000 or less;

(ii) a number average molecular weight of 20,000 or less;

(iii) an Mw/Mn of 5 or more; and (iv) a viscosity of 8000 mPa.s or less at 190° C.;

(b) a hydrocarbon resin; and (c) a polypropylene that is not tactic and has at least 30% crystallinity having a viscosity of 1500 mPa.s or less at 190° C. or a polypropylene that is tactic and has a viscosity of 1500 mPa.s or less at 190° C. provided that if the tactic polypropylene is not present, then the hydrocarbon resin comprises a cyclopentadiene-based hydrocarbon resin.

2. The adhesive of claim 1, wherein the copolymer has a viscosity of 7000 mPa.s or less at 190° C.

3. The adhesive of claim 1, wherein the copolymer has a viscosity of 5000 mPa.s or less at 190° C.

4. The adhesive of claim 1, wherein the polypropylene is present and has a viscosity of 1000 mPa.s or less at 190° C.

5. The adhesive of claim 1, wherein the adhesive has a viscosity of 5000 mPa.s or less at 190° C.

6. The adhesive of claim 1, wherein the adhesive has a viscosity of 4000 mPa.s or less at 190° C.

7. The adhesive of claim 1, wherein the adhesive has a viscosity of 3000 mPa.s or less at 190° C.

8. The adhesive of claim 1, wherein the adhesive has a viscosity of 2000 mPa.s or less at 190° C.

9. The adhesive of claim 1, wherein the adhesive has a viscosity of 1000 mPa.s or less at 190° C.

10. The adhesive of claim 1, wherein the termonomer comprises 0.5 to 15 mol % of one or more of ethylene, butane, pentene, hexene, heptene, octane, nonene, decene, undecene, dodecene, 3,5,5-trimethyl-1-hexene, 3-methyl-1-pentene, hexadiene, decadiene, dodecadiene, hexadecadiene, vinyl norbornene, and 4-methyl-1-pentene.

11. The adhesive of any one of claim 1, wherein the propylene is present in the copolymer at 40 to 90 mol %, the butene is present in the copolymer at 10 to 60 mol %, and the termonomer is present in the copolymer at 0 to 10 mole %.

12. The adhesive of claim 1, wherein the propylene is present in the copolymer at 60 to 70 mol %, the butane is present in the copolymer at 30 to 40 mol %, and the termonomer is present in the copolymer at 0.5 to 4 mol %.

13. The adhesive of claim 1, wherein the copolymer has a weight average molecular weight of 20,000 to 70,000.

14. The adhesive of claim 1, wherein the copolymer has an Mw/Mn of 5 to 10.

15. The adhesive of claim 1, wherein the copolymer has an Mw/Mn of 6 to 10.

16. The adhesive of claim 1, wherein the copolymer has an Mw/Mn of 7 to 10.

17. The adhesive of claim 1, wherein the copolymer has a weight average molecular weight of 20,000 to 70,000; an Mw/Mn of 6 to 10; a crystallinity of 30% or less; and a Tg of −5° C. or less.

18. The adhesive of claim 1, wherein the tactic polypropylene is present and comprises syndiotactic polypropylene having a viscosity of less than 1000 mPa.s at 190° C. and is present at up to 50 weight % based upon the weight of the copolymer and the polypropylene.

19. The adhesive of claim 1, wherein the polypropylene having a crystallinity of 30% or more is present and has a crystallinity of 40% or more.

20. The adhesive of claim 1, wherein the polypropylene having a crystallinity of 30% or more is present and has a crystallinity of 50% or more.

21. The adhesive of claim 1, wherein the tactic polypropylene is present and comprises isotactic polypropylene having a Tm of 150° C. or less.

22. The adhesive of claim 1, wherein the tactic polypropylene is present and comprises isotactic polypropylene having a Tm of 130° C. or less.

23. The adhesive of claim 1, wherein the tactic polypropylene is present and comprises isotactic polypropylene having a Tm of 120° C. or less.

24. The adhesive of claim 1, wherein the hydrocarbon resin is present and comprises a cyclopentadiene-based hydrocarbon resin which comprises the product of the thermal polymerization of a monomer stream comprising cyclopentadiene and dimers, trimers, tetramers or oligomers thereof.

25. The adhesive of claim 24, wherein the monomer stream further comprises from about 2 to 14 weight % of aromatic monomers, based upon the weight of the monomer stream.

26. The adhesive of claim 25, wherein the aromatic monomers are present at 4 to 10 weight %, based upon the weight of the monomer stream.

27. The adhesive of claims 25, wherein the aromatic monomers comprise one or more of styrene, alpha-methyl styrene and indene.

28. The adhesive of claim 24, wherein the cyclopentediene-based hydrocarbon resin has been hydrogenated.

29. The adhesive of claim 1, wherein the hydrocarbon resin is present and comprises aromatic modified hydrogenated polycyclopentadiene resin.

30. The adhesive of claim 1, wherein the copolymer and the polypropylene are present at 50 weight % or more, based upon the weight of the copolymer, the polypropylene and the resin.

31. The adhesive of claim 30 wherein the copolymer and the polypropylene are present at up to 75 weight %, based upon the weight of the copolymer, the polypropylene and the resin.

32. The adhesive of claim 30, wherein the copolymer and the tactic polypropylene are present at up to 85 weight %, based upon the weight of the copolymer, the polypropylene and the resin.

33. The adhesive of claim 30, wherein the copolymer and the polypropylene are present at up to 90 weight %, based upon the weight of the copolymer, the polypropylene and the resin.

34. The adhesive of claim 1, further comprising additional tackifier selected from the group consisting of aliphatic hydrocarbon resins, aromatic modified aliphatic hydrocarbon resins, hydrogenated polycyclopentadiene resins, polycyclopentadiene resins, gum rosins, gum rosin esters, wood roams, wood rosin esters, tall oil rosins, tall oil rosin esters, polyterpenes, aromatic modified polyterpenes, terpene phenolics, aromatic modified hydrogenated polycyclopentadiene resins, hydrogenated aliphatic resins, hydrogenated aliphatic aromatic resins, hydrogenated terpenes and modified terpenes, hydrogenated rosin esters, and mixtures thereof.

35. The adhesive of claim 1, wherein the tactic polypropylene is present, comprises isotactic polypropylene, and is present at up to 50 weight % based upon the weight of the copolymer and the polypropylene, and the hydrocarbon resin is selected from the group consisting of aliphatic hydrocarbon resins, aromatic modified aliphatic hydrocarbon resins, hydrogenated polycyclopentadiene resins, polycyclopentadiene resins, gum rosins, gum rosin esters, wood roams, wood rosin esters, tall oil rosins, tall oil rosin esters, polyterpenes, aromatic modified polyterpenes, terpene phenolics, aromatic modified hydrogenated polycyclopentadiene resins, hydrogenated aliphatic resins, hydrogenated aliphatic aromatic resins, hydrogenated terpenes and modified terpenes, hydrogenated rosin esters, and mixtures thereof.

36. The adhesive of any one of claim 1, wherein the polypropylene is isotactic polypropylene having a viscosity of less than 1000 mPa.s at 190° C. and is present at up to 50 weight % based upon the weight of the copolymer and the polypropylene, and the hydrocarbon resin comprises a cyclopentadiene-based hydrocarbon resin arid a tackifier selected from the group consisting of aliphatic hydrocarbon resins, aromatic modified aliphatic hydrocarbon resins, hydrogenated polycyclopentadiene resins, polycyclopentadiene resins, gum rosins, gum rosin esters, wood rosins, wood rosin esters, tall oil resins, tall oil rosin esters, polyterpenes, aromatic modified polyterpenes, terpene phenolics, aromatic modified hydrogenated polycyclopentadiene resins, hydrogenated aliphatic resins, hydrogenated aliphatic aromatic resins, hydrogenated terpenes and modified terpenes, hydrogenated rosin esters, and mixtures thereof.

37. A diaper comprising the adhesive of claim 1.

38. A hot melt adhesive comprising the adhesive of claim 1.

39. An adhesive comprising:

(a) a copolymer comprising butene and at least 40 mol % propylene, wherein the copolymer has
  - (i) a weight average molecular weight of 100,000 or less;
  - (ii) a number average molecular weight of 20,000 or less;
  - (iii) an Mw/Mn of 5 or more; and
  - (iv) a viscosity of 8000 mPa.sec or less at 190° C.;

(b) a cyclopentadiene-based hydrocarbon resin; and (c) a polypropylene having at least 30% crystallinity having a viscosity of 1500 mPa.s or less at 190° C.

40. The adhesive of claim 39, wherein the copolymer has a weight average molecular weight of 20,000 to 70,000; an Mw/Mn of 6 to 10; a crystallinity of 30% or less; and a Tg of −5° C. or less.

41. The adhesive of claim 39, further comprising a termonomer in an amount of less than 30 mol %, wherein the termonomer comprises about 0.5 to about 15 mol % of one or more of ethylene, butene, pentene, hexene, heptene, octene, nonene, decene, undecene, dodecene, 3,5,5-trimethyl-1-hexene, 3-methyl-1-pentene, hexadiene, decadiene, dodecadiene, and 4-methyl-1-pentene.

42. The adhesive of claims 39, wherein the propylene is present in the copolymer in an amount of 40 to 90 mol % and the butene is present in the copolymer in an amount of 10 to 60 mol %.

43. The adhesive of claim 41, wherein the propylene is present in the copolymer in an amount of 60 to 70 mol %, the butene is present in the copolymer in an amount of 30 to 40 mol %, and the termonomer is present in the copolymer at 0.5 to 4 mol %.

44. The adhesive of claim 39, wherein the cyclopentadiene-based hydrocarbon resin comprises the product of the thermal polymerization of a monomer stream comprising cyclopentadiene and dimers, trimers, tetramers or oligomers thereof.

45. The adhesive of claim 44, wherein the monomer stream further comprises from about 2 to 14 weight % of aromatic monomers, based upon the weight of the monomer stream.

46. The adhesive of claim 39, wherein the hydrocarbon resin comprises aromatic modified hydrogenated polycyclopentadiene resin.

47. The adhesive of claim 39, wherein the copolymer and the polypropylene, are present at 50 weight % or more, based upon the weight of the copolymer, the polypropylene and the hydrocarbon resin.

* * * * *